169-45

7/17/84 XR 4,460,128 SR

United States Patent [19]

Lazarre

[11] Patent Number: 4,460,128

[45] Date of Patent: Jul. 17, 1984

[54] APPARATUS FOR DISPERSING FLAMMABLE GASES INTO THE ATMOSPHERE

[75] Inventor: Flavien Lazarre, Pau, France

[73] Assignee: Societe Nationale Elf Aquitaine (Production), Courbevoie, France

[21] Appl. No.: 392,679

[22] Filed: Jun. 28, 1982

Related U.S. Application Data

[62] Division of Ser. No. 212,114, Dec. 2, 1980, Pat. No. 4,393,990.

[30] Foreign Application Priority Data

Dec. 7, 1979 [FR] France ................................ 79 30069

[51] Int. Cl.$^3$ ..................... G05D 16/00; G05D 16/20; F17C 13/12; B05B 1/14

[52] U.S. Cl. ..................................... 239/533.1; 98/59; 110/184; 169/45

[58] Field of Search .................... 431/4, 5, 202; 98/58, 98/59; 110/184; 239/1, 8, 11, 63, 533.1, 570, 590.3; 169/45, 56, 69

[56] References Cited

U.S. PATENT DOCUMENTS 4,232,595 11/1980 Cox ................................ 110/184 X

*Primary Examiner*—Andres Kashnikow

*Attorney, Agent, or Firm*—Brisebois & Kruger

[57] ABSTRACT

Apparatus for dispersing waste gas in the form of mixtures of controlled composition. This apparatus ejects the gas through at least one nozzle at a pressure above blast pressure and below the stable ignition pressure in the presence of a flame, these blast and ignition pressures being predetermined in relation to the area of the nozzle opening. The apparatus can comprise a number of nozzles which diverge relative to each other, the area S of the opening which corresponds to a diameter $d=\sqrt{4S/\pi}$, with a minimum angle $\alpha\alpha$ between the axes of adjoining nozzles, and a distance D between each nozzle opening, and wherein $D/d \geqq 80$ and $\alpha \geqq 20°$.

3 Claims, 4 Drawing Figures

APPARATUS FOR DISPERSING FLAMMABLE GASES INTO THE ATMOSPHERE

This is a division, of application Ser. No. 212,114, filed Dec. 2, 1980, now U.S. Pat. No. 4,393,990.

This invention concerns an improvement in processes and devices to disperse waste gas into the atmosphere in the form of mixtures of controlled composition, and more specifically mixtures in which the percentage of waste gas is below the lower explosion liability limit.

Various gas-dispersal devices already available are designed both to bring the gas down to atmospheric pressure, and to mix in sufficient quantities of air to stop the mixture from being explosive, and keep it from causing pollution.

Cold flares or "vent" comprise preliminary devices to reduce the gas pressure to a level slightly above atmospheric pressure. The same precautions are needed in building these cold flares as for hot flares, since ignition is possible at any time, if only as a result of meterological phenomena such as static electricity or lightning. They are therefore as expensive as hot flares. Furthermore, even when they are functioning properly, there is always the danger that, when there is no wind, explosive clouds may form, creating a dangerous situation for rigs at sea, where such devices are mainly used.

French Pat. No. 2 225 200, filed by the present applicant, describes another type of disperser. It comprises a mixing pipe, generally cylindrical and with a symmetry axis, equipped with a coaxial injector nozzle connected to a high-pressure gas source. Such devices can be supplied at the variable pressure of a container being emptied, or at the uniform pressure of a discharge pipe. In these devices, the kinetic energy of the gas under pressure is used to move the air needed for the mixture.

With the possibility of an optimalizing system, and with one or more injectors, these dispersers become extremely space-consuming, for schemes involving larger and larger flow-rates.

This invention overcomes this difficulty by ejecting the gas through a nozzle, at a pressure higher than blast pressure and lower than the stable ignition pressure in the presence of a flame; these blast and stable ignition pressures are determined in relation to the surface area of the nozzle opening.

Use of pressures within this range make it unnecessary to use a mixing pipe, which constitutes the bulkiest part of atmospheric dispersers.

When gas containing 95% or more methane is ejected at a velocity of not more than the speed of sound, minimum relative pressure ranges from a few millibars to 2 bars, and maximum relative pressure from more than 90 bars to approximately 12 bars, when the surface area of the ejection opening ranges from a few square millimeters to 300 square millimeters.

When the gas is ejected at a velocity of more than the speed of sound, minimum relative pressure ranges from a few millibars to 2.5 bars, and maximum relative pressure from more than 150 bars to approximately 20 bars, when the surface area of the ejection opening ranges from a few to 300 square millimeters.

When the falling pressure of the flammable gas reaches a level close to minimum pressure, an inert gas such as nitrogen or carbon dioxide is injected, so as to dilute the gas, and keep the composition of the diluted-gas/air mixture in the resulting free jet below the lower explosion liability limit, or make the gas temporarily non-flammable, to extinguish any flame by cutting off fuel to it.

For gas containing less than 95% methane, and with various amounts of ingredients, appropriate minimum and maximum pressures need to be calculated.

This new device to disperse flammable gas into the atmosphere comprises at least one nozzle with an opening of specified surface area, extending above a pipe with an internal cross-sectional area (CSA) which is greater than that of the nozzle, and which can be altered by a system connected to means of monitoring the ejection pressure from the nozzle, so that this pressure is kept between a minimum level, above blast pressure, and a maximum level, below the stable ignition pressure in the presence of a flame, these minimum and maximum gas-ejection pressures, measured directly at the nozzle inlet, being specified, for gas with a specified composition, in relation to the surface area of the nozzle opening.

In other embodiments, this gas-dispersal device comprises at least one nozzle, the cross-sectional area of the opening of which can be adjusted between minimum and maximum levels, by a system connected to means of monitoring the ejection pressure from the nozzle, so that this pressure is kept between a minimum level, above blast pressure, and a maximum level, below the stable ignition pressure in the presence of a flame, these minimum and maximum gas-ejection pressures being specified, for gas with a specified composition, in relation to the surface-area of the nozzle opening.

Where such a device comprises a number of nozzles the axes of which diverge with respect to each other, the surface area S of the opening of which corresponds to a diameter $d\text{-}\sqrt{4S/\pi}$, with a minimum angle $\alpha$ between the axes of the adjoining nozzles and a distance D between nozzle openings, is characterized by the fact that $D/d \geqq 80$ and $a \geqq 80$.

The invention will be described by means of the following embodiment, without being in any way confined to such an embodiment, illustrated by the accompanying figures.

Figure 1:
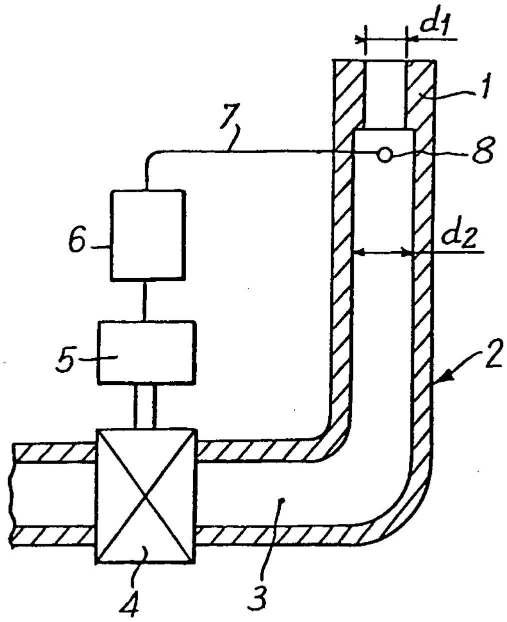
FIG. 1 shows an atmospheric disperser with fixed-diameter nozzle.

FIG. 1 shows a nozzle 1, with fixed diameter $d_1$, extending from a vertical pipe 2 of diameter $d_2$, connected to a horizontal gas-supply pipe 3; $d_1$ is less than $d_2$.

The pipe 3 is equipped with a valve 4, the operating device 5 of which is controlled by impulses from a monitoring system 6, connected by a conductor 7 to a pressure detector 8 inside the pipe 2, near the nozzle 1. As long as the supply pressure is below or equal to stable ignition pressure, the valve 4 performs no function.

Figure 2:
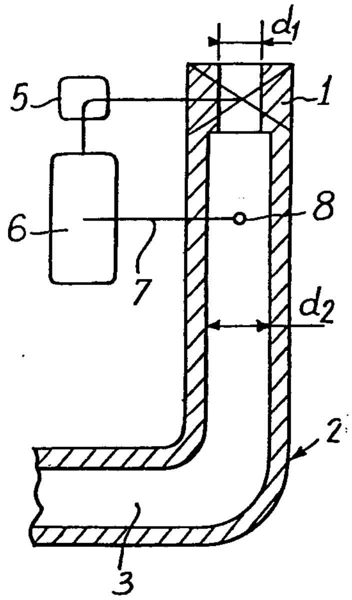
FIG. 2 shows an atmospheric disperser with variable-diameter nozzle.

FIG. 2 shows a nozzle 1 with a variable diameter $d_1$, extending above a vertical pipe 2 of diameter $d_2$, connected to a horizontal gas-supply pipe 3.

This nozzle is connected to an operating device 5, which is controlled by impulses from a monitoring system 6, connected by a conductor 7 to a pressure detector 8 inside the pipe 2, near the nozzle 1. In all cases, $d_1$ is less than $d_2$.

Figure 3:
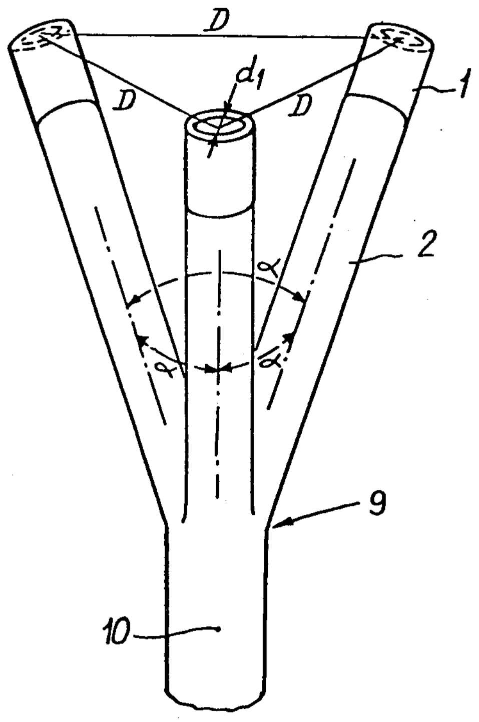
FIG. 3 shows an atmospheric disperser with three nozzles.

FIG. 3 shows a diagrammatical view in perspective of an atmospheric dispenser with three nozzles. Each nozzle 1 extends from a straight pipe 2, at an angle $\alpha$ to each of the other nozzles, so that the three pipes coverge at a given point 9, where they are connected to a gas-supply pipe 10. D is the distance between nozzle openings.

For convenience, and because it is the commonest case, the three straight pipes 2 are also at an angle to a vertical centre-line.

The following two conditions prevail on this type of atmospheric disperser:

$D/d_1 \geqq 80=$ and $\alpha \geqq 20°$.

Figure 4:
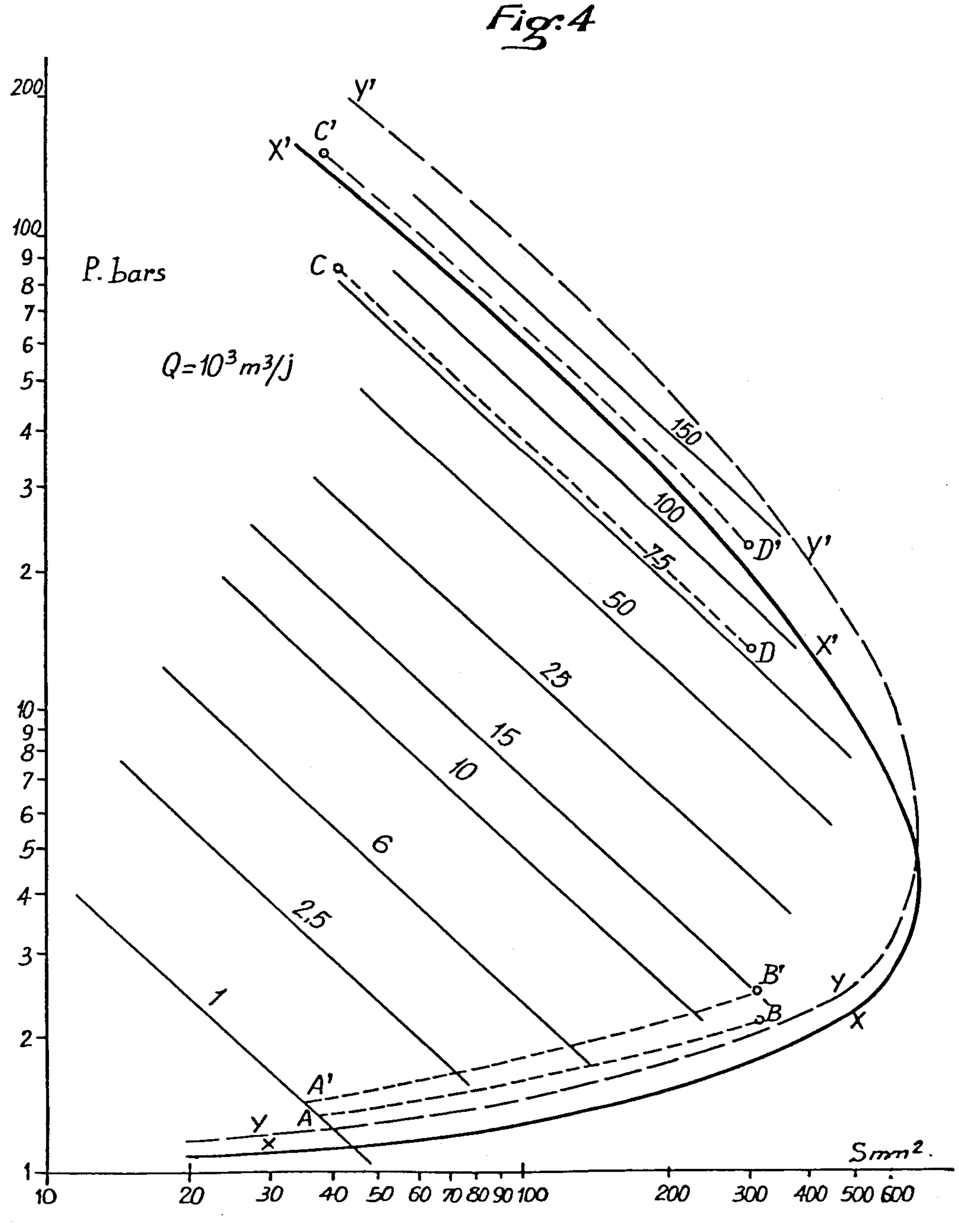
FIG. 4 is an ejection-pressure/nozzle CSA chart.

FIG. 4 is a diagram showing pressures in bars on the ordinate and the surface area of the nozzle opening in square mm on the abscissa. This graph has been established for gas containing 85% methane, 3% ethane, the remainder consisting of higher homologues and inert gases.

The graph shows two curves:

a continuous line XX-X'X', the portion XX of which represents blast pressure, and the portion X'X' of which represents stable ignition pressure, for nozzles with an ejection velocity of not more than the speed of sound, such as cylindrical nozzles;

a broken line YY-Y'Y', the portion YY of which represents blast pressure, and the portion Y'Y' of which represents stable ignition pressure for a nozzle with supersonic flow-rate, such as the "Laval" converging-diverging nozzle referred to in § 1 283 of booklet J1442-13, chapter "Mécanique des Fluides", by George Cohen de Lara, volume "Chimie et Génie Chimiqie I", pbd. by *Les Techniques de l'Ingenieur,* 21 rue Cassette, Paris 7.

The curves AB and CD represent zones of minimum and maximum pressures for subsonic ejection velocities, and the curves A'B' and C'D' the zones of minimum and maximum pressure for supersonic ejection velocities.

The graph also shows portions of curves representing ejection pressure to the nozzle CSA for given flow-rates ($Q \times 10^3$ $m^3$/day), in accordance with the formula $Q = kSP$, where S is the surface area of the nozzle in square mm, P the ejection pressure in bars, and k a coefficient characterizing the gas being ejected.

This gas shows that a supersonic-velocity nozzle offers much higher performances than the blocked subsonic-velocity nozzle, as regards maximum flow-rates.

For gases containing smaller proportions of methane, for example 85%, the remainer consisting mainly of inert gases such as nitrogen or carbon dioxide, with a few percent of higher homologues, the graph will be similar to the one shown here, with a widening upwards and downwards of the non-flammable zone. This phenomenon increases as the inert gas content rises.

The lower explosion-liability limit for pure methane is 5% and it rises in proportion to the inert gas content of methane/inert-gas mixtures; when the inert gas content approaches 50%, the mixture becomes non-flammable.

For gases containing a large percentage of higher homologues, the non-flammable zone is reduced considerably: the curve representing blast pressure shifts in the direction of the increase in pressure.

What is claimed is:

1. Apparatus to disperse flammable gas into the atmosphere, comprising at least one nozzle with an opening of specified surface area, extending above a pipe with an internal cross-sectional area which is greater than that of the nozzle, and which can be altered by a system connected to means for monitoring the ejection pressure from the nozzle, so that this pressure is kept between a minimum level, above explosion pressure, and a maximum level, below the stable ignition pressure in the presence of a flame, these minimum and maximum gas-ejection pressures being specified, for gas with a specified composition, in relation to the surface area of the nozzle opening, and wherein said at least one nozzle comprises a plurality of nozzles having axes which diverge relative to each other toward the nozzle openings at a minimum angle of $\alpha$, the surface area S of the opening of each nozzle corresponds to a diameter $d = \sqrt{4S/\pi}$, the nozzle openings are spaced from each other by a distance D, and $D/d \geqq 80$.

2. Apparatus for dispersing flammable gas into the atmosphere, comprising at least one nozzle, the cross-sectional area of the opening of which can be adjusted, between minimum and maximum levels, by a system connected to means of monitoring the ejection pressure from the nozzle, so that this pressure is kept between a minimum level, about blast pressure, and a maximum level, below the stable ignition pressure in the presence of a flame, these minimum and maximum gas-ejection pressures being specified, for gas with a specified composition, in relation to each different surface area of the nozzle opening, and wherein said at least one nozzle comprises a plurality of nozzles having axes which diverge relative to each other toward the nozzle openings at a minimum angle of $\alpha$, the surface area S of the opening of each nozzle corresponds to a diameter $d = \sqrt{4S/\pi}$, the nozzle openings are spaced from each other by a distance D, and $D/d \geqq 80$.

3. Apparatus according to claim 1 or claim 2 wherein $\alpha \geqq 20°$.

* * * * *